United States Patent
Duda

(10) Patent No.: US 10,778,505 B2
(45) Date of Patent: Sep. 15, 2020

(54) SYSTEM AND METHOD OF EVALUATING NETWORK ASSERTS

(71) Applicant: Arista Networks, Inc., Santa Clara, CA (US)

(72) Inventor: Kenneth James Duda, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 330 days.

(21) Appl. No.: 15/152,500

(22) Filed: May 11, 2016

(65) Prior Publication Data
US 2017/0331711 A1 Nov. 16, 2017

(51) Int. Cl.
*G06F 15/173* (2006.01)
*H04L 12/24* (2006.01)

(52) U.S. Cl.
CPC ................. *H04L 41/0631* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,313,552 | B2* | 12/2007 | Lorenz | G06N 5/025 706/45 |
| 8,453,196 | B2* | 5/2013 | Lerner | G06F 9/546 726/1 |
| 9,330,109 | B2* | 5/2016 | Bone | G06F 17/30082 |
| 9,979,594 | B2* | 5/2018 | Koide | H04L 41/0806 |
| 2010/0191843 | A1* | 7/2010 | Bohm | G06F 9/547 709/223 |
| 2013/0239192 | A1* | 9/2013 | Linga | G06F 21/44 726/7 |
| 2017/0250869 | A1* | 8/2017 | Voellmy | H04L 41/0893 |

* cited by examiner

*Primary Examiner* — Brian Whipple
*Assistant Examiner* — Anthony T Rotolo
(74) *Attorney, Agent, or Firm* — Haley Guiliano LLP

(57) ABSTRACT

A method and apparatus of a device that evaluates multiple network asserts in response to changing network of network elements is described. In an exemplary embodiment, the device receives the multiple network asserts, where each of the plurality of network asserts represents a Boolean expression regarding a condition of at least one characteristic of at least one of the network elements. The device further detects a change in the network. In response to the detected change, the device, for one or more of the network asserts, evaluates this network assert to determine if this network asserts raises an action associated with this network assert. The device further performs the action associated this network assert if the network assert was raised.

18 Claims, 7 Drawing Sheets

SYSTEM AND METHOD OF EVALUATING NETWORK ASSERTS

FIELD OF INVENTION

This invention relates generally to data networking, and more particularly, to managing a network using multiple network asserts.

BACKGROUND OF THE INVENTION

An enterprise will have a network of devices that is used to perform various functions of the enterprise. This network can include thousands or more devices organized into one or more data centers. It can be, however, difficult to determine whether if one, some, or all of these devices are operating properly. For example, one of the network elements in the network may be dropping too many packets, have a path/forwarding information misconfiguration, service unreachability, or have other types of network misbehaviors. One way to detect issues with one or more devices is for an administrator to log into each of the devices and use a command line interface (CLI) to retrieve the counter data of that device or review the configuration. However, using a CLI is tedious for administrator to use on a network with thousands or more devices.

Another way to manage a network is to use a network management station (NMS) that is used to manage the individual devices in the network. Typically, an NMS manages each of the devices in the network using the Simple Network Management Protocol (SNMP). An SNMP-based NMS will poll each of the devices for counter values to determine if each of these devices is operating properly. In addition, the NMS can set traps to alert the administrator if a counter value is outside a defined range of values. A problem with this approach is that a trap cannot be set for possible combinations of counters for one device or across multiple devices. In addition, NMS traps work on counter data and do not detect other types of network misbehaving, such as routing misconfigurations, path unreachability, and/or service unreachability. Furthermore, the NMS needs to poll each of the devices for the counter information.

SUMMARY OF THE DESCRIPTION

A method and apparatus of a device that evaluates a plurality of network asserts in response to a change in a network of a plurality of network elements is described. In an exemplary embodiment, the device receives the plurality of network asserts, wherein each of the plurality of network asserts represents a Boolean expression regarding a condition of at least one characteristic of at least one of the plurality of network elements. The device further detects a change in the network. In response to detecting the change, the device evaluates one or more of the network asserts to determine if the one or more of the network asserts raises an action associated with that network assert. The device further performs the action associated with each raised network assertion.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
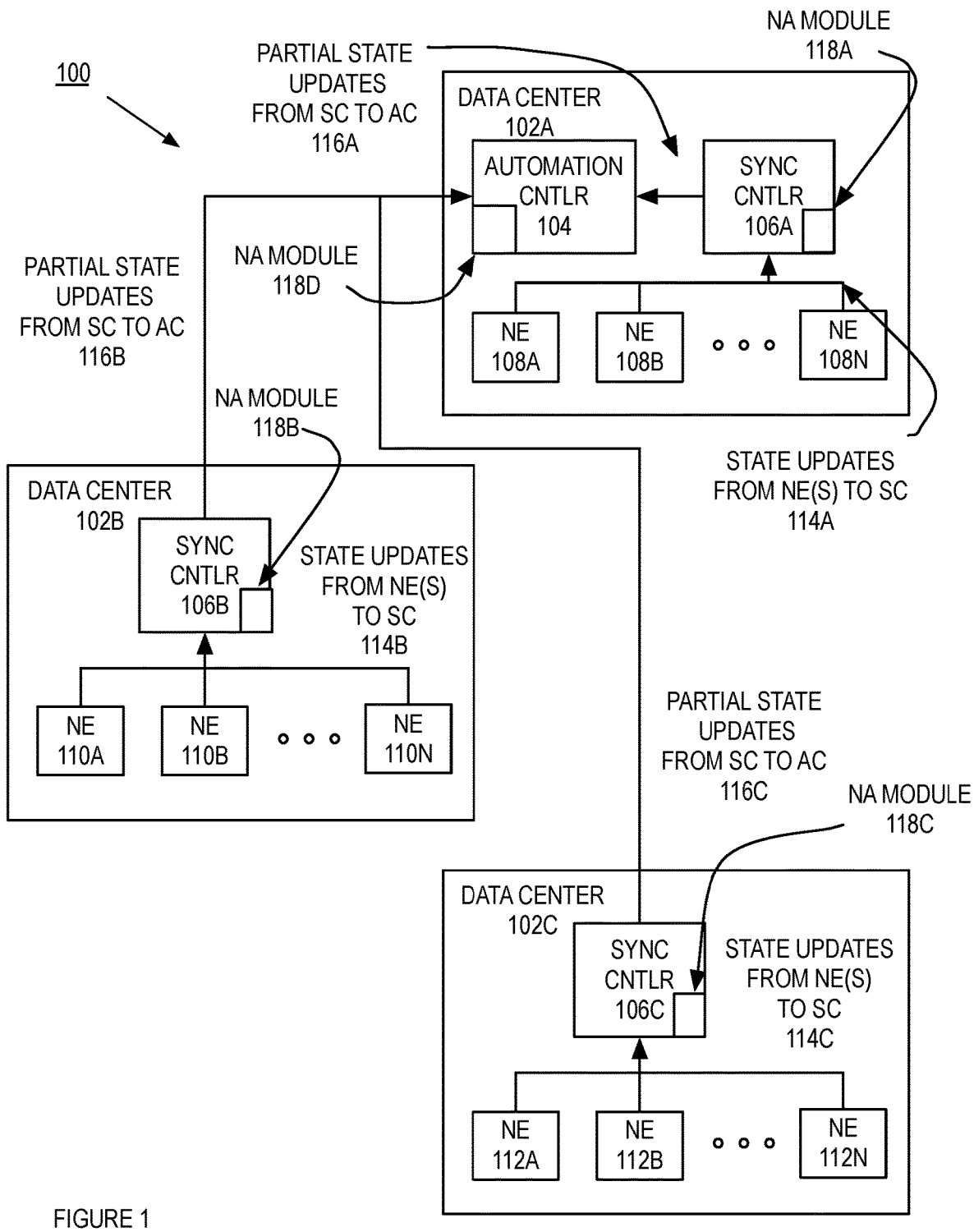
FIG. 1 is a block diagram of one embodiment of a network of multiple data centers of an enterprise, where network controllers determine changes in the network and evaluate network asserts against those changes.

A method and apparatus of a device that evaluates multiple network asserts in response to changing network of network elements is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that evaluates multiple network asserts in response to a changing network of network elements is described. In one embodiment, the device receives state change information from multiple network elements. In one embodiment, the state change information can include any or all changes to the state of that device. For example and in one embodiment, the state change can include for any or all available sources within a network element, including from various levels of the control plane software system (e.g., agent state, system logs, kernel state), shared memory system (e.g., routing tables, shared memory counters), platform specific hardware state (e.g., hardware internal counters, buffer analysis data, etc.), network interface counters, command line changes, network management system based changes, and/or automatic state changes.

In addition, the device receives multiple network asserts, where each network assert is a set of rules on how a network should be operating. For example and in one embodiment, there can be a network assert regarding correct link connectivity, topology arrangement, routing or forwarding table size consistency, various different protocol connectivity between endpoints in the network, counter trends, counter coherences, address protocol coherence, access control list connectivity/non-connectivity, quality of service characteristics, path latencies, network element feature and/or software levels, and/or other types of network asserts.

With the network asserts, in one embodiment, the device can evaluate the network asserts in response to receiving the state change information. For example and in one embodiment, if the device receives forwarding information as the state change information, the device can determine if critical paths are reachable by evaluating one or more network asserts associated with these critical paths. In another example, in response to receiving counter data from a device, the device can determine counter trends using a network assert associated with this counter. If the device raises the assert for a network assert, the device performs an action associated with that assert, such as raising a notification.

FIG. 1 is a block diagram of one embodiment of a network of multiple data centers of an enterprise, where network controllers 104 and 106A-C determine changes in the network and evaluate network asserts against those changes. In FIG. 1, network 100 includes data centers 102A-C that are coupled together via a data communications network (not illustrated). In one embodiment, a data center is a facility used to house computer systems, networking equipment, storage system, and/or other types of equipment for an enterprise. Each of the data centers 102A-C can house up to thousands of network elements. In one embodiment, each of the network elements is coupled to the data communications network and can be managed by a management device. Each of the data centers 102A-C may be located in a separate region that is geographically remote from the other data centers 102A-C. For example and in one embodiment, each of the data centers 102A-C may be located in a different region in a country, such as data center 102A may be in San Francisco, data center 102B may be in Dallas, and data center 102C may be in New York. In another embodiment, each of the data centers 102A-C may be located in different countries and/or continents, for example, data center 102A may be located in the United States, data center 102B may be located in China, and data center 102C may be located in Europe. While in one embodiment, network 100 is illustrated with three data centers 102A-C, in alternative embodiments, network 100 may have more or less data centers.

In one embodiment, it can be difficult to determine if one or more of the possibly tens of thousands of network elements (or more) that are located in these multiple data centers 102A-C are running properly. One way of managing the network elements in the data centers 102A-C is for each data center 102A-C to have a network management station (NMS) that is used to manage the network elements in the data center that includes the NMS. Typically, an NMS manages each of the network elements in the data center using the Simple Network Management Protocol (SNMP). An SNMP-based NMS, however, does not scale well when the number of devices in that data center approaches 5000 or more network elements. However, each of the NMSes will either poll each of the network elements in the data center 102A-C or have traps for counter data. In addition, an SNMP-based NMS will not include information pertaining to configuration data outside of the counter data, such current forwarding information on each of the network elements in the data centers 102A-C.

As illustrated in FIG. 1, and in one embodiment, network 100 includes a two-tier system to manage the data center network elements and to evaluate the network asserts that are used to monitor those network elements in the data center 102A-C. In one embodiment, each of the data centers 102A-C can include hundreds or thousands of network elements. For example and in one embodiment, data center 102A includes network elements 108A-N, data center 102B includes network elements 110A-N, and data center 102C includes network elements 112A-N. Data centers 102A-C can include differing numbers of network elements in each of these data centers. In one embodiment, the network element can be switch, router, hub, bridge, gateway, etc., or any type of device that can allow access to a network. In one embodiment, the network element can be a virtual machine.

While in one embodiment, the network asserts are described in terms of network elements, in alternate embodiments, the network asserts can work with devices other than network elements, such as computer systems, storage devices, or another type of device that is managed by a network connection. In one embodiment, a computer system can be a personal computer, laptop, server, mobile device (e.g., smartphone, laptop, personal digital assistant, music playing device, gaming device, etc.), and/or any device capable of executing a process. In one embodiment, a storage system can be a device capable of providing storage for other devices (e.g., server, networked storage device, distributed storage, redundant storage, and/or another type of device being capable of providing storage for another device). In one embodiment, any of these can be a virtual machine or can be a device that hosts one or more virtual machines.

In one embodiment, the network elements in these data centers 102A-C are managed using a two-tier structure. In this embodiment, each of the data centers 102A-C includes a synchronization controller 106A-C, respectively, that is coupled to the devices in the respective data center. For example and in one embodiment, synchronization controller 106A is coupled to network elements 108A-N, synchronization controller 106B is coupled to network elements 110A-N, and synchronization controller 106C is coupled to network elements 112A-N. In one embodiment, each of the synchronization controllers 106A-C is coupled to the respective devices via a high-speed communications network (e.g., 1 Gbps or 10 Gbps network). In this embodiment, each of the synchronization controllers 106A-C receives state change information from each of the network elements coupled to that synchronization controller 106A-C. In one embodiment, the state change information can include any or all changes to the state of that device. For example and in one embodiment, the state change can include for any or all available sources within a network element, including from various levels of the control plane software system (e.g., agent state, system logs, kernel state), shared memory system (e.g., routing tables, shared memory counters), platform specific hardware state (e.g., hardware internal counters, buffer analysis data, etc.), network interface counters, command line changes, network management system based changes, and automatic state changes. In one embodiment, the forwarding state of a device can include routes, address information, address resolution information, and/or other types of forwarding information change. If the device is a computer system, changes to the state can include: resource usage, configuration changes, counter updates, and other types of state change for a computer system. If the device is a storage device, changes to the state can include: resource usage, configuration changes, counter updates, and other types of state change for a storage device. For example and in one embodiment, the synchronization controller can receive state update changes as described in U.S. patent application Ser. No. 15/165,329, entitled "TRACKING STATE OF COMPONENTS WITHIN A NETWORK ELEMENT" filed on May 26, 2016, and U.S. patent application Ser. No. 15/165,358, entitled "DATA ANALYTICS ON INTERNAL STATE" filed on May 26, 2016, which are incorporated by reference herein.

With the accumulated state change information from the network elements in that data center, the synchronization controller 106A-C has a current state for each of the network elements in the data center as well as the ability to reconstruct the historical state for each of those devices. Using this state change information, and in one embodiment, each of the synchronization controllers 106A-C forwards some or all of the state change information collected by that synchronization controller. For example and in one embodiment, each of the synchronization controllers 106A-C forwards all of the state change information collected from the network elements in the respective data center except for the forwarding state change information. In this example, each of the synchronization controllers 106A-C would forward state change information such as described above.

In one embodiment, one or more of the data centers 102A-C can also include an automation controller, such as automation controller 104, that is used to receive state change information from each the synchronization controllers 106A-C. In one embodiment, the automation controllers 104 can be a computer system, a network element, or another type of device that can be used to receive state change information from the devices in the data center. In one embodiment, this state change information can include all the state change information collected by each of the synchronization controllers 106A-C except for the forwarding information (e.g., routes, address information, address resolution information, and/or other types of forwarding information). In this embodiment, the automation controller 104 takes the received state change information from the synchronization controllers 106A-C and generates an overall state of the network 100. For example and in one embodiment, the network state can be a view of the resource usage across the data centers 102A-C. Alternatively, the network state can include indications of performance issues or outages in the network 100. For example and in one embodiment, the overall network state may indicate that data center 102A is running at 75% capacity, data center 102B is running at 20% capacity, and data center 102C is running at 25% capacity.

In one embodiment, with this network state information collected by either the automation controller 104 or one of the synchronization controllers 106A-C, each of these network controllers 104 and/or 106A-C can evaluate anyone (or some or all) of the network asserts known this controller. In one embodiment, network asserts are a set of rules on how a network should be operating. For example and in one embodiment, there can be a network assert regarding correct link connectivity or topology arrangement, routing or forwarding table size consistency, various different protocol connectivity between endpoints in the network, counter trends, counter coherences, address protocol coherence, access control list connectivity/non-connectivity, quality of service characteristics, path latencies, network element feature and/or software levels, and/or other types of network asserts.

In addition, there can be different classes of network asserts. For example and in one embodiment, there are compliance and health network asserts. A compliance network assert, when raised, indicates that the network (or a part of the network) is operating in a manner that is out of compliance. If a compliance network assert is raised, an urgent action can be performed. A health network assert, when raised, indicates that the network (or a part of the network) is not operating in a healthy manner. A raised health network assert may or may not be as urgent as a raised compliance network assert.

In one embodiment, a network assert represents a Boolean expression regarding a condition of at least one characteristic of a network element known to the network controller. This expression can include a variety of different operations: logical operations (AND, OR, NOT), grouping operations ("(", ")"), comparison operations (=, >, <, ≥, ≤, and the not analogs of the comparisons operations (e.g., ≠, and others), pattern match operations (*, ?, regular expression, and other types of pattern match operations), and/or other types of operations. In addition, each of the network asserts can include variables that can represent information extracted from one or more of the network elements. For example and in one embodiment, a network controller 104 and/or 106A-C can extract some or all of the following information from the network state the network controller 104 and/or 106A-C receives: system name, number of interfaces, interface name and type, various counter data, forwarding information, reachability information, neighbor information (e.g., such as is provided by Link-Layer Discovery Protocol (LLDP) or similar mechanisms), routing adjacency information (e.g., such as is provided by protocols such as Open Shortest Path First (OSFP) or Intermediate System to Intermediate System (IS-IS)), routing peer information (e.g., such as is provided by protocols such as Border Gateway Protocol (BGP)), network probing information (e.g., such as is provided by tools such as ping and traceroute), link aggregation information (e.g., such as is provided by protocols such as Link Aggregation Control Protocol (LACP)), layer-2 topology information (e.g., such as is provided by protocols such as Spanning Tree Protocol (STP)) and/or other types of network state information. In one embodiment, the network assert is a Boolean expression string that includes one or more logical operation. In another embodiment, the network assert is a graphical representation of a Boolean expression that includes one or more logical operation.

In one embodiment, each of the network controllers 104 and/or 106A-C can have a network assertion module 118A-D that evaluates the network assertions known to that network controller 104 and/or 106A-C as the network changes. In one embodiment, if one of the synchronization controllers 106A-C receives a network state change update from one or more of the devices known to that synchronization controllers 106A-C, that synchronization controller 106A-C evaluates one, some, or all of the network asserts known to that synchronization controller 106A-C to determine if one or more of the network asserts should be raised. If a network assert is raised, the synchronization controller 106A-C performs an action associated with this network assert, such as sending a notification, gathering data, logging data, sending a trap (e.g., a Simple Network Management Protocol (SNMP) trap), running a script that can take further actions (e.g., performing a network reconfiguration), sending a syslog message to a syslog collector, other actions, and/or a combination thereof. Thus, as the network is changing states, one or more of the network controllers 104 and/or 106A-C evaluate network asserts to determine if the network or part of the network is operating properly (or improperly).

For example and in one embodiment, for network elements 110A-N in data center 102B, as the network elements 110A-N forwards updates from these devices to the synchronization controller 106B, the synchronization controller 106B receives the updates and, in response to receiving the updates, the synchronization controller 106B evaluates the network asserts known to the synchronization controller 106B to determine if any of the network asserts are raised. As described above, by raising a network assert, the synchronization controller 106B performs an action associated with the raised network asserts. Similarly, each of the synchronization controller 106A and 106C can evaluate the network asserts as changes to the network state are received by these synchronization controllers.

In one embodiment, the automation controller 104 receives network state updates as well from the synchronization controllers 106A-C. In this embodiment, while the network state updates received by the automation controller 104 is not as detailed as network state updates received by the synchronization controllers 106A-C (e.g., the automation controller 104 does not receive changes in the forwarding states), the automation controller 104 receives network state updates that can be used to evaluate network asserts known to the automation controller 104 as these updates are received by the automation controller 104.

Figure 2:
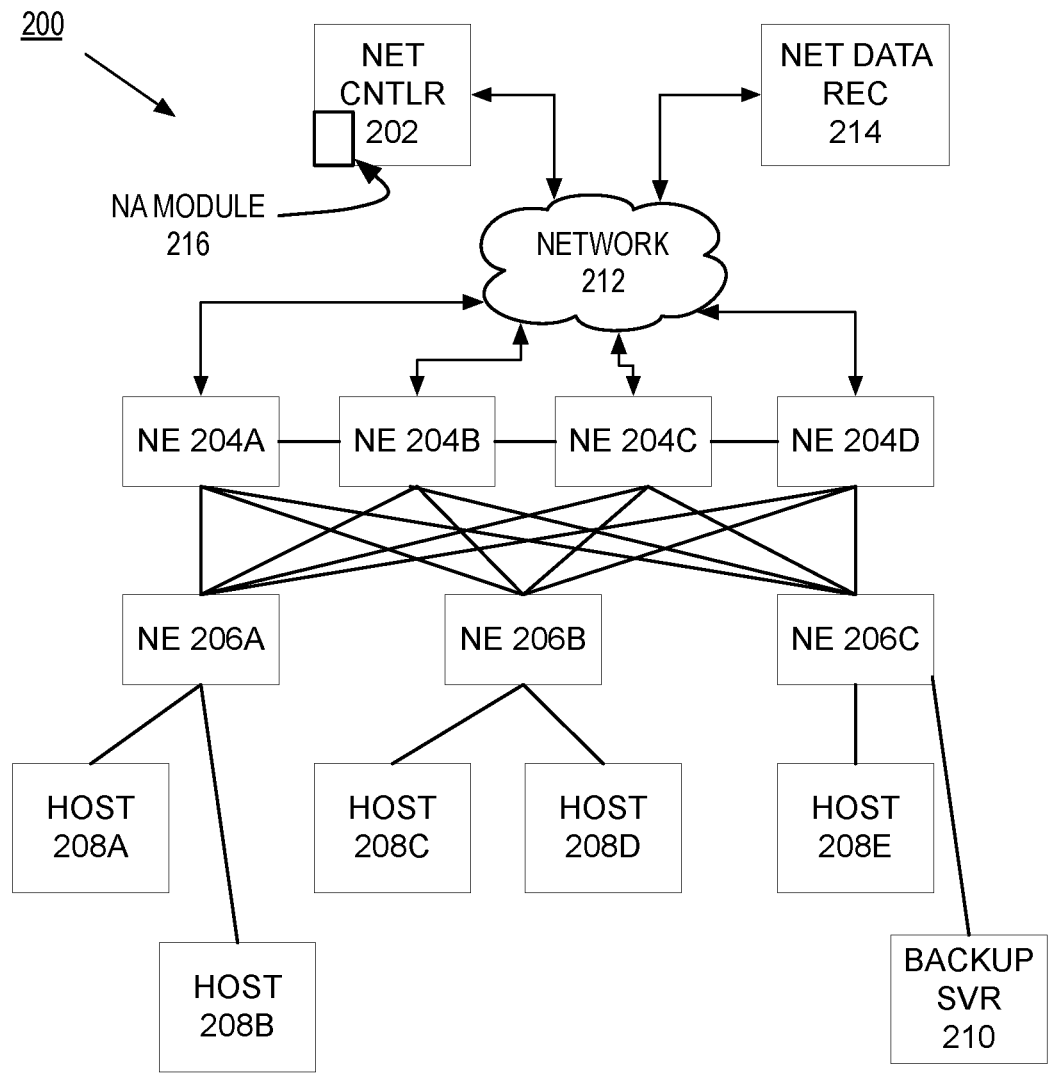
FIG. 2 is a block diagram of one embodiment of a network of a leaf-spine network architecture.

As described above, the network asserts are a set of rules for how the network should be running. The network asserts can be used to check a variety of network conditions using the network state updates that are received by the network controllers. For example and in one embodiment, the network asserts can be use to check network topology or connectivity at a variety of protocol levels. FIG. 2 is a block diagram of one embodiment of a network 200 of a leaf-spine network architecture. In FIG. 2, the network 200 includes spine network elements 204A-D that are coupled to each of the leaf network elements 206A-C. The leaf network element 206A is further coupled to hosts 208A-B, leaf network element 206B is coupled to hosts 208C-D, and leaf network element 206C is coupled to network element 208E. In one embodiment, a spine network element 204A-D is a network element that interconnects the leaf network elements 206A-C. In this embodiment, each of the spine network elements 204A-D is coupled to each of the leaf network elements 206A-C. Furthermore, in this embodiment, each of the spine network elements 204A-D are coupled with each other. While in one embodiment, the network elements 204A-D and 206A-C are illustrated in a spine and leaf topology, in alternate embodiments, the network elements 204A-D and 206A-C can be in a different topology. In one embodiment, each of the network elements 204A-D and/or 206A-C can be a router, switch, bridge, gateway, load balancer, firewall, network security device, server, or any other type of device that can receive and process data from a network. While in one embodiment, there are four spine network elements 204A-D, three leaf network elements 206A-C, five hosts 208A-E, and one backup server 210, in alternate embodiments, there can be more or less numbers of spine network elements, leaf network elements, backup servers, hosts, and/or other types of devices (not illustrated).

In one embodiment, the network elements 204A-D and 206A-C can be the same or different network elements in terms of manufacturer, type, configuration, or role. For example and in one embodiment, network elements 204A-D may be routers and network elements 206A-C may be switches. As another example and embodiment, network elements 204A-D may be high capacity switches with relatively few 10 gigabit (Gb) or 40 Gb ports and network elements 206A-C may be lower capacity switches with a large number of medium capacity port (e.g., 1 Gb ports). In addition, the network elements may differ in role, as the network elements 204A-D are spine switches and the network elements 206A-C are leaf switches. Thus, the network elements 204A-D and 206A-C can be a heterogeneous mix of network elements.

If one of the leaf network elements 206A-C is transmitting a packet to another leaf network element 206A-C, the source network element 206A-C has choice of which spine network element 204A-D to use to forward the packet to the destination leaf network element 206A-C. For example and in one embodiment, if host 208A transmits a packet destined for host 208E, host 208A transmits this packet to the leaf network element coupled to host 208A, leaf network element 206A. The leaf network element 206A receives this packet and determines that the packet is to be transmitted to one of the spine network elements 204A-D, which transmits that packet to the leaf network element 206C. The leaf network element 206C then transmits the packet to the destination host 206E. In addition, there is a backup server 210 that is used by one or more of the hosts 208A-E, where the backup server 210 is coupled to the leaf network element 208E. In this embodiment, each of the network host will need connectivity at the protocol level used for the backups (e.g., TCP connectivity). Furthermore, the network 200 includes a network data recorder 214 that is used to record data for various purposes (e.g., aggregate syslogs and alerts from different types of equipment including network switches, servers, storage boxes, application controllers, etc., and provide filtering, reporting, event correlation, and/or other actions)). In this embodiment, the network elements 204A-D and 206A-C and/or hosts 208A-E that use the network data recorder 214 will need connectivity to the network data recorder 214 in order to use this service.

Because of the topology and connectivity that is used for the functioning of the network 200, the network controller 202, in one embodiment, includes a network assert module 216 that is used to evaluate network asserts known to this module 216 as the state of the network 200 changes. In this embodiment, the network controller 202 also includes network asserts used to monitor the topology and connectivity of the network 200. In one embodiment, the network controller 202 includes a network assert that is used to monitor the topology of the leaf-spine architecture. In this embodiment, this network assert checks that a leaf network element is not connected to another leaf network element. For example and in one embodiment, the network assert for a leaf-leaf topology check can be:

```
Link (A, B) : !match (A.systemname, "leaf") OR
              !match (B.systemname, "leaf")
```

This assert determines if network elements A and B are leaf network elements and if there is a link between these two network elements. If there is, this network assert is raised, as two leaf network elements should not be linked together (instead, network data forwarded between these two lead network elements is forwarded through one of the spine network elements). If not, no network assert is raised as this topology check is in order. In one embodiment, this leaf-leaf network assert can be used to check for mis-cabling errors. Other types of network asserts for a leaf-spine architecture can ones for: (i) leaf spine links use a leaf's high speed interface that is linked spine interface; (ii) leaf host links use a leaf's downlink interface; and/or (iii) leaf host link are to a server and not to another device (e.g., not to another switch or other network element).

In another embodiment, the network controller 202 can include network asserts that are used to monitor if the desired connectivity is maintained in the network 200. For example and in one embodiment, there can be one or network asserts to monitor desired connectivity in the network 200. In one example, there can be a network assert for checking connectivity from the hosts coupled to the backup server 210. This assert can check connectivity using a simple PING utility, which test reachability of a path using an Internet Protocol (IP). Alternatively, the network assert can check connectivity on a path to the backup server 210 using a different protocol, such a Transmission Control Protocol (TCP) or another type of protocol. Furthermore, and in another embodiment, there can be a network assert that is used to check the connectivity from one or more of the network elements 204A-D and/or 206A-C to the network data recorder 212 using PING or another type of protocol (e.g., the actual protocol used to communicate data between the network elements 204A-D and/or 206A-C and the network data recorder 212). In a further embodiment, connectivity network asserts can be based on a number of different protocols for network connectivity checks (e.g., Hypertext transport protocol (HTTP), voice protocol(s), and/or other types of protocols).

As described above, network asserts can be used for a variety of different operating checks. In one embodiment, a network assert can be used to determine if a forwarding table is consistent for a group of network elements. For example and in one embodiment, and with reference to FIG. 1, the network elements for each of the data centers 102A-C should have forwarding tables that are relatively the same size over a period of time. In this example, for data center 102B, the network elements 110A-N should have forwarding tables with approximately the same size over time. As forwarding updates are made, the forwarding tables will change in size, but over time the size of the forwarding tables should settle down to a consistent size. If the forwarding tables for a group of network elements converge to different sizes, a network assert may be raised.

In another example and embodiment, there can be a network assert for multicast environment coherence. In this example, if a network element is configured for multicast routing (or forwarding), neighboring network elements should be appropriately configured. More specifically, if a network element is configured with a layer-3 routing protocol, downstream layer-2 network elements should be configured so that multicast packets can be properly forwarded (e.g., these network elements are configured for a layer 2 group management protocol snooping). Another type of network asserts can be an address resolution protocol assert that detects if two different devices have the same media access control (MAC) addresses, so as to prevent MAC address conflicts. This assert can be evaluated for each change detected in address resolution protocol (ARP) table.

In a further example, and embodiment, there can be a network assert regarding quality of service (QoS) conditions. For example and in one embodiment, a network assert can be used to measure path latencies. In this example, the network assert can define one or more paths in the network that are tested for end-to-end latencies. An end-to-end latency can be measured by injecting a test packet at one network element and measuring the travel time this test packet takes along the path. In another example, and embodiment, there can be a network assert to test access control list (ACL) connectivity (or lack of connectivity).

Another class of network asserts are network asserts that monitor and compare various types of counter data that is available as part of the reported changing network state. In one embodiment, there can be network asserts that are based on trends of one or more counters for one or more network elements. For example and in one embodiment, the trend for transmitted data on an interface should be within x % of a time average trend of historical data over a window. Otherwise, this pattern usage would raise the network assert along with a corresponding action (log assert, send a notification, or some other action). In another example, a network assert could involve a comparison of multiple counters, where the assert is raised if there is an inconsistency between these counters. As a more specific example, there can be a network assert that compares the transmits and receive counters of a network element. In this example, if there is a significant difference between the sum of the transmit and the sum of the receive counters, there could be a hardware problem with this network element. This example illustrates the use of the network assert in building a more complex relationship to be evaluated than having a single alert based on a single counter value.

Figure 3:
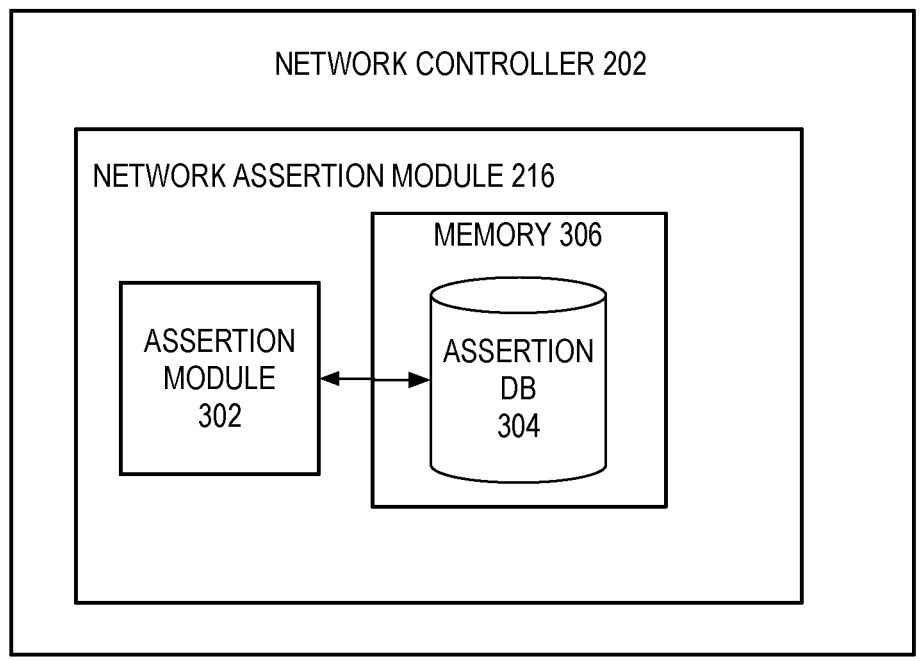
FIG. 3 is a block diagram of one embodiment of a network controller with a network assertion module.

As described above, each of the network controllers illustrated in FIGS. 1 and 2 can have a network assertion module that evaluate network asserts as the network controller receives updates to a state of a network. FIG. 3 is a block diagram of one embodiment of a network controller 202 with a network assertion module 216. In one embodiment, the network controller 202 can be either the automation controller 104 or one of the synchronization controllers 106A-C as illustrated in FIG. 1. In FIG. 3, the network controller 202 includes the network assertion module 216. The network assertion module 216 further includes an assertion module 302 that evaluates the network asserts stored in an assertion database 304. In one embodiment, the assertion database 304 is stored in memory 306. In one embodiment, the network controller 202 receives from a central point (e.g., the automation controller 104 as illustrated in FIG. 1), received form another device (e.g., a network management station), and/or can be input by a network administrator.

Figure 4:
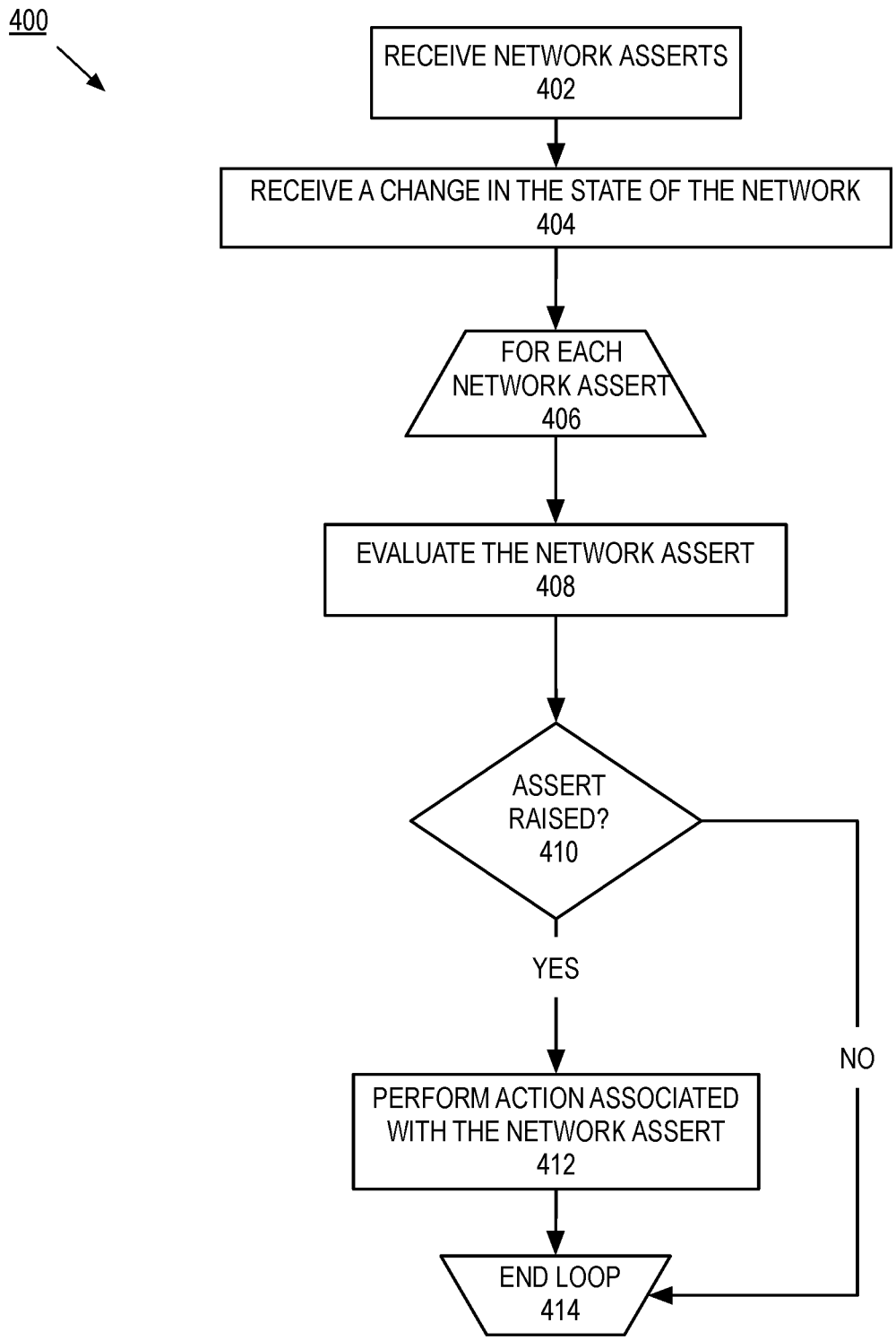
FIG. 4 is a flow diagram of one embodiment of a process to evaluate network asserts in response to detecting a change in the network.

FIG. 4 is a flow diagram of one embodiment of a process 400 to evaluate network asserts in response to detecting a change in the network. In one embodiment, process 400 is performed by a network assertion module to evaluate network asserts in response to detecting a change in the network, such as the network assertion module 216 as illustrated in FIG. 3 above. In FIG. 3, process 400 begins by receiving the network asserts at block 402. In one embodiment, the network asserts are a set of rules that describe how the network should operate. At block 404, process 400 receives a change in the state of the network. In one embodiment, a change in the state in the network can be any or all changes to the state of device(s) known to the network controller. For example and in one embodiment, the state change can include for any or all available sources within a network element, including from various levels of the control plane software system (e.g., agent state, system logs, kernel state), shared memory system (e.g., routing tables, shared memory counters), platform specific hardware state (e.g., hardware internal counters, buffer analysis data, etc.), network interface counters, command line changes, network management system based changes, and automatic state changes. In one embodiment, the forwarding state of a device can include routes, address information, address resolution information, and/or other types of forwarding information change. If the device is a computer system, changes to the state can include: resource usage, configuration changes, counter updates, and other types of state change for a computer system. If the device is a storage device, changes to the state can include: resource usage, configuration changes, counter updates, and other types of state change for a storage device.

With the received changes to the network state received by process 400, process 400 can evaluate the network asserts against these received change(s). Process 400 executes a processing loop (blocks 406-414) to evaluate the network asserts against the change network state for each of the network asserts. At block 408, process 400 evaluates the network assert against the current state of the network known to the network controller. In one embodiment, process 400 determines the data and extracts this data from a database, such as a database of network state information maintained by the network controller. In this embodiment, with the extracted data, process 400 evaluates the Boolean expression of the network assert to determine the results of this Boolean expression. With this Boolean result, process 400 determines if the network assert has been raised at block 410. If the network assert has been raised, process 400 performs the action associated with the network assert. In one embodiment, the type of action that can be raised is a type of notification, such as sending a email, sending a text, enacting an automation voice call, logging the raised assert, sending a trap, sending a syslog collector, other actions, and/or another type of notification. In one embodiment, more urgent types of notifications are used for compliance type network asserts, as when a compliance network assert is raised, it means that the network is out of compliance (e.g., legal compliance, customer compliance, or another type of compliance). For example and in one embodiment, if a certain network connectivity fails (e.g. connectivity to a network data recorder), the associated action for this type of network assert can be an automated voice call made to one or more network administrators as this type of condition may need to be dealt with quickly. As another example and embodiment, if a health network assert is raised (e.g., a counter is trending outside of the range defined in the network assert), the associated action may be sending of an email. Execution proceeds to block 414. If the network assert is not raised, execution proceeds to block 414. The processing loop ends at block 414.

Figure 5:
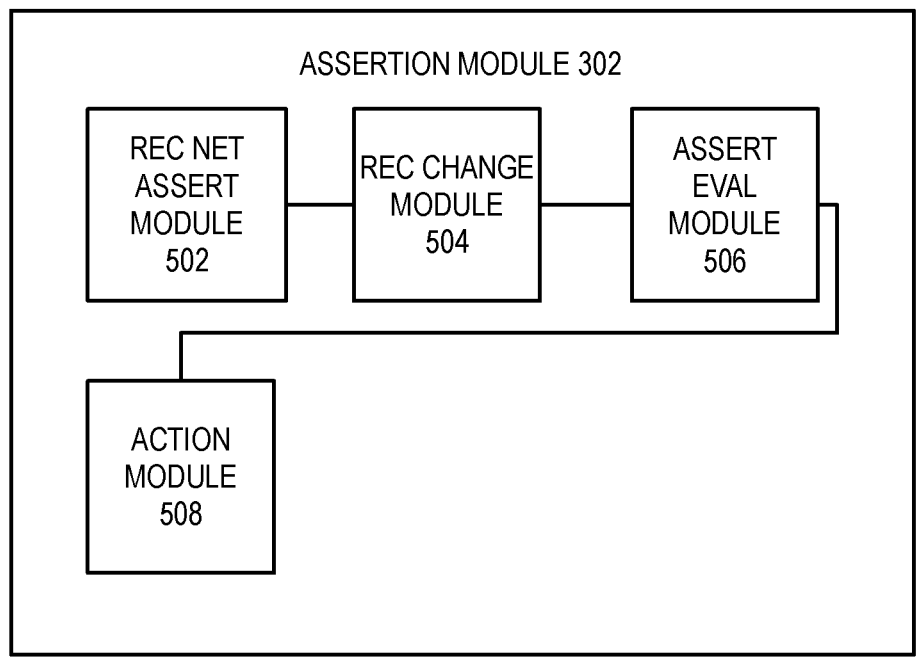
FIG. 5 is a block diagram of one embodiment of an assertion module that evaluates network asserts in response to detecting a change in the network.

FIG. 5 is a block diagram of one embodiment of an assertion module 302 that evaluates network asserts in response to detecting a change in the network. In one embodiment, the assertion module 302 includes a receive network asserts module 502, receive change module 504, assert evaluation module 506, and action module 508. In one embodiment, the receive network asserts module 502 receives the network asserts as described in FIG. 4, block 402 above. The receive change module 504 received the network change as described in FIG. 4, block 404 above. The assert evaluation module 506 evaluates the network assert as described in FIG. 4, block 408 above. The action module 508 performs the associated action as described in FIG. 4, block 412 above.

Figure 6:
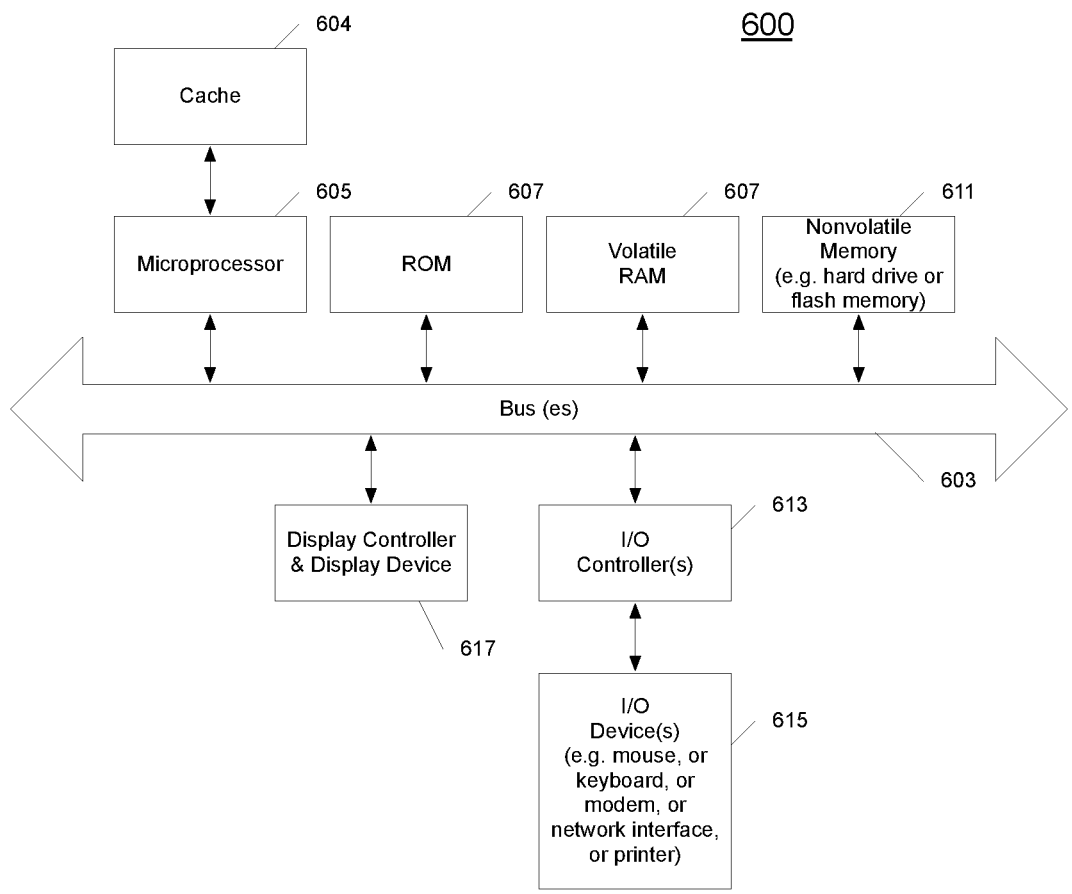
FIG. 6 illustrates one example of a typical computer system, which may be used in conjunction with the embodiments described herein.

FIG. 6 shows one example of a data processing system 600, which may be used with one embodiment of the present invention. For example, the system 600 may be implemented including a network controller 104 and/or 106A-C as shown in FIG. 1 above. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 617 and to peripheral devices such as input/output (I/O) devices which may be mice, keyboards, modems, network interfaces, printers and other devices which are well known in the art. In one embodiment, the system 600 includes a plurality of network interfaces of the same or different type (e.g., Ethernet copper interface, Ethernet fiber interfaces, wireless, and/or other types of network interfaces). In this embodiment, the system 600 can include a forwarding engine to forward network date received on one interface out another interface.

Typically, the input/output devices 615 are coupled to the system through input/output controllers 613. The volatile RAM (Random Access Memory) 609 is typically implemented as dynamic RAM (DRAM), which requires power continually in order to refresh or maintain the data in the memory.

The mass storage 611 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Figure 7:
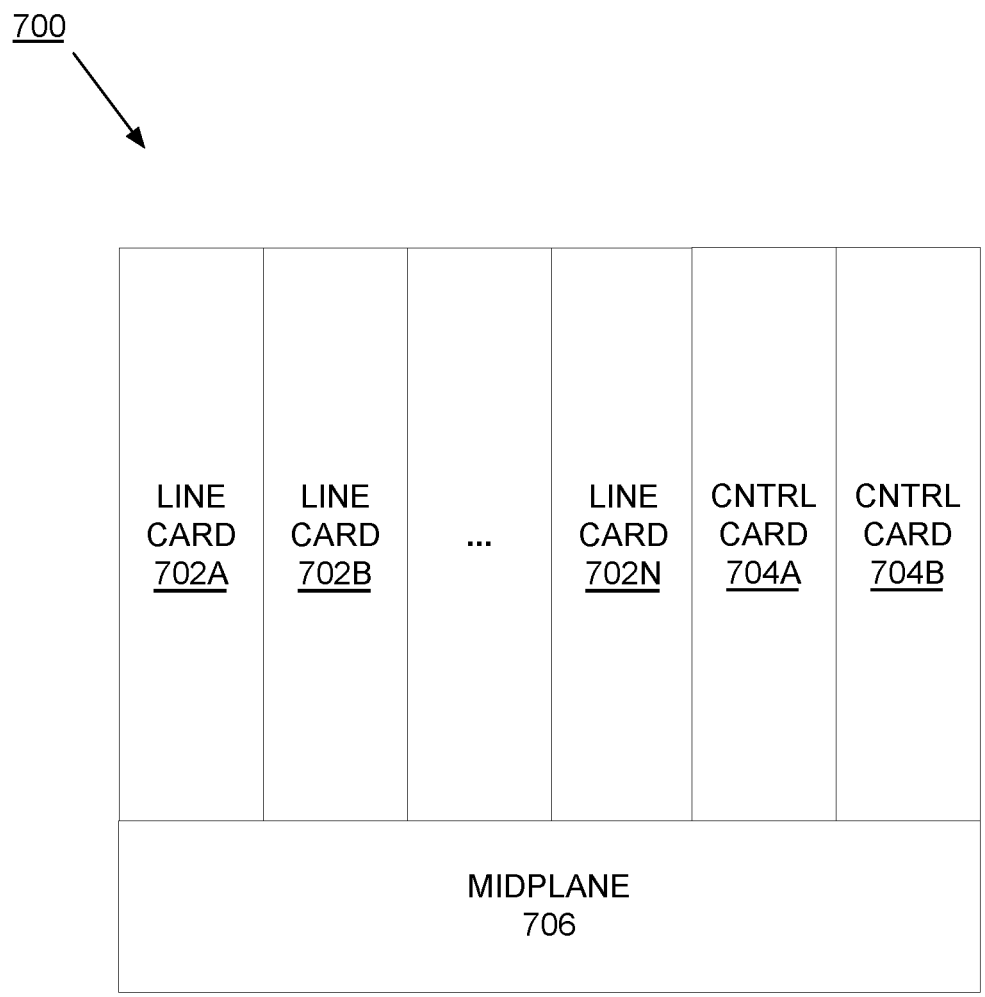
FIG. 7 is a block diagram of one embodiment of an exemplary network element 700 that evaluates network asserts.

FIG. 7 is a block diagram of one embodiment of an exemplary network element 700 that evaluates network asserts. In FIG. 7, the midplane 706 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., evaluating network asserts). In one embodiment, the controller cards 704A-B evaluates network asserts as described in FIGS. 2 and 4. In this embodiment, one or both of the controller cards 704A-B include assertion module, such as the assertion module 302 as described in FIG. 5 above. It should be understood that the architecture of the network element 700 illustrated in FIG. 7 is exemplary, and different combinations of cards may be used in other embodiments of the invention.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "evaluating," "performing," "receiving," "sending," "reconfiguring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to evaluate a plurality of network asserts in response to a change in a computer network of a plurality of network devices, the method comprising: receiving the plurality of network asserts, wherein each of the plurality of network asserts represents a Boolean expression regarding a condition of at least one characteristic of at least one of the plurality of network devices, each of the plurality of network asserts is a set of one or more rules for how the computer network should operate among sets of two or more of the plurality of network devices, and each of the plurality of network devices communicates data with another one of the plurality of network devices; detecting a change in the computer network; wherein the detecting the change comprises: receiving an update from one of the plurality of network devices without requesting the update; and in response to detecting the change, for one or more of the plurality of network asserts, evaluating this network assert to determine if this network asserts raises an action associated with this network assert, and performing the action associated this network assert if the network assert was raised.

2. The non-transitory machine-readable medium of claim 1, wherein the change is a change in at least one of the characteristics of at least the one of the plurality of network devices.

3. The non-transitory machine-readable medium of claim 1, wherein at least one of the plurality of network asserts represents a Boolean expression regarding a condition of at least two separate characteristics of at least two different ones of the plurality of network devices.

4. The non-transitory machine-readable medium of claim 1, wherein the change is a change in at least two of the characteristics of at least two of the plurality of network devices.

5. The non-transitory machine-readable medium of claim 1, wherein the detecting the change comprises: receiving an update from one of the plurality of network devices based on establishing a subscription for the updates.

6. The non-transitory machine-readable medium of claim 1, wherein the change in the computer network is selected from the group consisting of changes to counter data, agent state, system logs, kernel state changes, forwarding tables, and buffer analysis data.

7. The non-transitory machine-readable medium of claim 1, wherein each of the network asserts is selected for the group consisting of a path reachability assert, topology assert, forwarding table consistency assert, multicast environment coherence assert, quality of service assert, counter trend asserts, and multiple counter assert.

8. The non-transitory machine-readable medium of claim 1, wherein each of the network asserts is selected from the group consisting of a health and compliance network assert.

9. The non-transitory machine-readable medium of claim 1, wherein the performing an action comprises: sending a notification for this network assert.

10. The non-transitory machine-readable medium of claim 1, wherein the detecting the change comprises: receiving an update from one of the plurality of network devices based on establishing a subscription for the updates.

11. A method to evaluate a plurality of network asserts in response to a change in a computer network of a plurality of network devices, the method comprising: receiving the plurality of network asserts, wherein each of the plurality of network asserts represents a Boolean expression regarding a condition of at least one characteristic of at least one of the plurality of network devices, each of the plurality of network asserts is a set of one or more rules for how the computer network should operate among sets of two or more of the plurality of network devices, and each of the plurality of network devices communicates data with another one of the plurality of network devices; detecting a change in the computer network; wherein the detecting the change comprises: receiving an update from one of the plurality of network devices without requesting the update; and in response to detecting the change, for one or more of the plurality of network asserts, evaluating this network assert to determine if this network asserts raises an action associated with this network assert, and performing the action associated this network assert if the network assert was raised.

12. The method of claim 11, wherein the change is a change in at least one of the characteristics of at least the one of the plurality of network devices.

13. The method of claim 11, wherein at least one of the plurality of network asserts represents a Boolean expression regarding a condition of at least two separate characteristics of at least two different ones of the plurality of network devices.

14. The method of claim 11, wherein the change is a change in at least two of the characteristics of at least two of the plurality of network devices.

15. The method of claim 11, wherein the change in the computer network is selected from the group consisting of changes to counter data, agent state, system logs, kernel state changes, forwarding tables, and buffer analysis data.

16. The method of claim 11, wherein each of the network asserts is selected for the group consisting of a path reachability assert, topology assert, forwarding table consistency assert, multicast environment coherence assert, quality of service assert, counter trend asserts, and multiple counter assert.

17. The method of claim 11, wherein each of the network asserts is selected from the group consisting of a health and compliance network assert.

18. A device for evaluating a plurality of network asserts in response to a change in a network of a plurality of network devices, the device comprising: a processor; a memory coupled to the processor though a bus; and a process executed from the memory by the processor causes the processor to receive the plurality of network asserts, wherein each of the plurality of network asserts represents a Boolean expression regarding a condition of at least one characteristic of at least one of the plurality of network devices, each of the plurality of network asserts is a set of one or more rules for how the network should operate among sets of two or more of the plurality of network devices, and each of the plurality of network devices communicates data with another one of the plurality of network devices, detect a change in the network, wherein the detecting the change comprises: receiving an update from one of the plurality of network devices without requesting the update and in response to detecting the change, for one or more of the plurality of network asserts, the process further causes the processor to evaluate this network assert to determine if this network asserts raises an action associated with this network assert, and perform the action associated this network assert if the network assert was raised.

* * * * *